United States Patent [19]

Adrion

[11] 3,992,112
[45] Nov. 16, 1976

[54] ATTENUATING IMAGE EXTENDER FOR MULTIPLE IMAGING SYSTEM

[75] Inventor: Robert F. Adrion, Cary, N.C.

[73] Assignee: Corning Glass Works, Corning, N.Y.

[22] Filed: Sept. 29, 1975

[21] Appl. No.: 617,417

[52] U.S. Cl. .................................. 356/201; 350/30; 350/285; 350/314; 356/39; 356/178
[51] Int. Cl.² .................... G02B 5/00; G02B 27/00
[58] Field of Search .............................. 350/30–35, 350/285, 314; 356/39, 178, 179, 195, 201

[56] References Cited
UNITED STATES PATENTS

| | | | |
|---|---|---|---|
| 3,205,767 | 9/1965 | Weber et al. | 350/314 |
| 3,709,579 | 1/1973 | Makosch | 350/30 |
| 3,721,164 | 3/1973 | Kuttigen et al. | 350/285 |
| 3,770,354 | 11/1973 | Tsuruta et al. | 356/178 |
| 3,776,995 | 12/1973 | Little | 350/285 |
| 3,817,626 | 6/1974 | Lietar | 350/30 |
| 3,819,913 | 6/1974 | Carter et al. | 356/39 |

*Primary Examiner*—John K. Corbin
*Assistant Examiner*—Richard A. Rosenberger
*Attorney, Agent, or Firm*—William J. Simmons, Jr.; Walter S. Zebrowski; Clarence R. Patty, Jr.

[57] ABSTRACT

Disclosed is an optical system for dividing a single optical image into two or more geometrically identical images which are contiguous and coplanar in space and which have the same magnification. A beam splitter and a fold mirror divide the original optical path into a first optical path which forms an image from light passing through the beam splitter and a second optical path which forms an image from light reflected from the beam splitter and fold mirror. A displacement block is inserted into the second optical path to move the image plane away from the fold mirror and cause the images formed from the first and second paths to become coplanar. The displacement block is mounted so that it can rotate about two axes so that one image can be positioned precisely adjacent to the other image. By forming the block from two glasses having different absorption characteristics light in the second path is adjustably attenuated.

10 Claims, 4 Drawing Figures

ATTENUATING IMAGE EXTENDER FOR MULTIPLE IMAGING SYSTEM

Cross-Reference to Related Application

This application is related to U.S. Pat. application Ser. No. 617,416 entitled "Multiple Imaging Optical System" filed on even date herewith.

Background of the Invention

This invention relates to a system for processing an optical image in such a manner that it is separated into two contiguous coplanar images having the same magnification. More particularly, it relates to an optical system for forming from a single optical image two differently colored images on the target or image plane of a television camera tube.

In automated analysis of blood samples, pattern recognition techniques have been shown to be effective in distinguishing the normal adult types of leukocytes of the peripheral blood. See, J. W. Bacus, "An Automated Classification of the Peripheral Blood Leukocytes by Means of Digital Image Processing", Ph.D. Thesis, University of Illinois, 1971 and I. T. Young, "Automated Leukocyte Recognition", *Automated Cell Identification and Cell Sorting*, (G. L. Wied and G. F. Bahr, Eds.) New York, Academic Press, 1970, pp. 187–194. Pattern recognition algorithms are used to extract information from digitized images of stained blood smears. The pattern analysis and recognition emulate in a computer the hematology technician who performs cell classification. The ultimate application of the research on recognition schemes is the automation of the leukocyte differential count — a common, yet complex, manual task of a hospital's hematology laboratory.

The blood sample is prepared by smearing a small quantity of blood on a standard glass slide to produce a uniform monolayer of cells. After drying, the smear is processed with a blood stain of the Romanowsky type which stains erythrocytes pink and the nuclei of leukocytes violet. Cytoplasm regions of leukocytes stain differentially, depending upon the cell type. Since color information about the cell, as well as its size and shape, are characteristic of its class, a classification system must utilize color to extract significant information about the cell type.

A color television camera tube and the electronics to drive the tube are expensive. An alternative to a color camera can be achieved with a monochrome television system and at least two color filters. Since the stain mixture has only two characteristic peaks in the visible spectrum, blue and yellow optical filters can be placed in the optical path to produce two gray-level pictures which are representative of the spectrum existing on the stained slide. For example, a blue filter can be inserted in the optical path between the microscope slide and the camera tube, and after the image is scanned, the blue filter can be replaced by a yellow filter and the resultant image is again scanned. This scene sequential scan technique is disadvantageous in that it is too time consuming. Moreover, if an image is changing with time, the second image may be somewhat different from the first.

It is therefore preferred that the two colored images be simultaneously presented to the camera tube in a side-by-side relationship so that they may be line sequentially scanned. A system of this type is disclosed in U.S. Pat. No. 3,819,913 wherein a single optical path derived from a microscope is split into a dual optical path by an optical system including a pair of beam splitters. Since one of the paths is longer than the other, the images from the two paths will form in two different planes. Thus, if the shorter path image is caused to form on the target of the detector or camera tube, the longer path image will appear in a plane in front of the target, and the resolution of the system is degraded.

In said related application Ser. No. 617,416, there is disclosed an optical system including a beam splitter and a fold mirror for splitting a single optical path derived from a microscope into parallel optical paths which form coplanar, side-by-side optical images on the camera tube target. Optimal operation of an automated blood cell identification system requires the two images on the camera tube target to be aligned and contiguous. Although precise alignment of the optical system disclosed in said copending application provides the desired relationship between images, it is difficult to fabricate such a precisely aligned optical system. Moreover, since the sensitivity of the camera tube depends upon the wavelength of the light impinging upon the target, it is sometimes desirable to attenuate the light forming the image to which the camera tube is most sensitive.

Summary of the Invention

It is therefore an object of the present invention to provide an optical system for splitting an optical path and forming at least two coplanar, contiguous optical images therefrom. Another object is to provide an optical system for improving the resolution of an automated blood cell identification system.

The present invention relates to a system for analyzing different characteristics of an optical image. This system comprises means for producing an image-containing light beam, and a first beam splitter in the path of the light beam for transmitting a first portion of the beam along a first optical path and for reflecting a second portion of the light beam in a direction away from the first path. Means are provided for reflecting the second portion of the light beam slong a second optical path which is parallel with the first optical path. Means disposed in at least one of the optical paths modifies a characteristic of the image formed along that path. A detector is provided for converting optical images into electrical signals, the detector having a planar target disposed in the image plane of the first optical path. A block of transparent material is disposed in the second optical path, the surfaces of the block through which light passes being planar and parallel, and the distance between these surfaces being such that the image formed along the second path is coplanar with the target. The block is movable in a direction perpendicular to the second path, and the effective optical density presented by the block to the second path depends upon the portion of the block that is traversed by the second path. Utilization means is connected to the detector and is responsive to the electrical signal therefrom.

Detailed Description of the Invention

Figure 1:
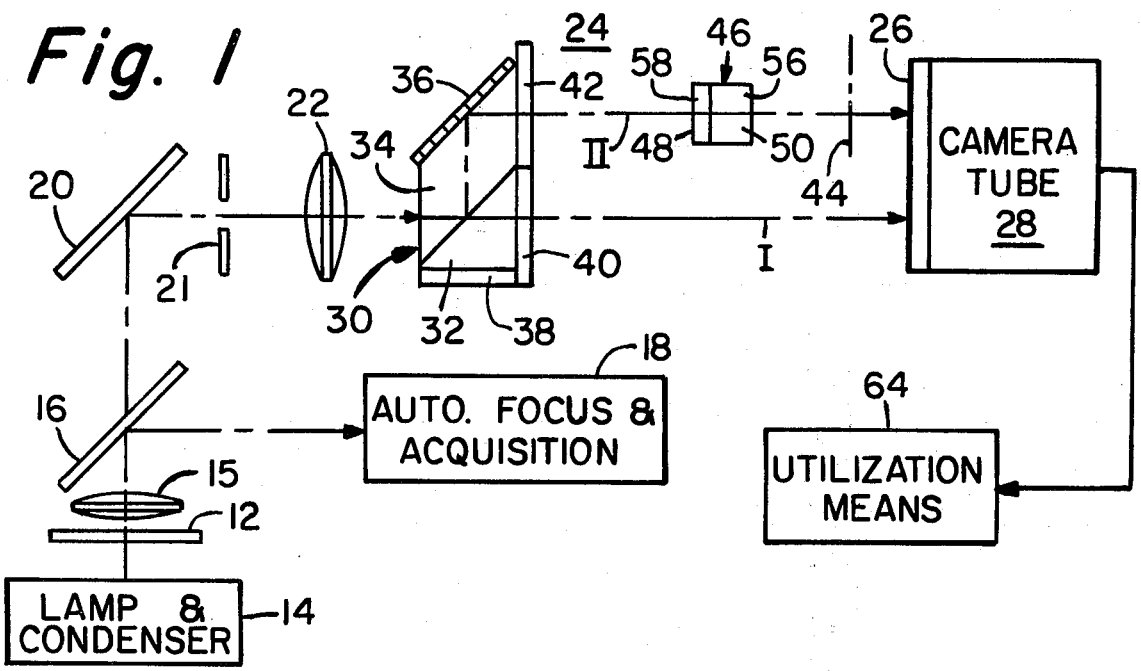
FIG. 1 is a schematic diagram of a system for processing an optical image.

FIG. 1 shows the optical chain for a system for scanning and counting leukocytes on a blood smeared slide 12. Light from the lamp and condenser unit 14 passes through slide 12 and objective lens 15 and is intercepted by beam splitter 16 which reflects a portion of the light to the automatic focus and acquisition subsystem 18 which causes the cells to be focused. The remainder of the light is transmitted by way of mirror 20, aperture defining means 21 and lens 22 to an optical system 24 which divides the light beam into a dual split optical path and causes two images to be focused on target 26 of camera tube 28.

The light beam from lens 22 impinges upon beam splitter 30 which may consist of a prism 32 having a triangular cross section and a prism 34 having a rhomboidal cross section. In a preferred embodiment, the surface of prism 32 is metallized to form a half silvered mirror which transmits and reflects approximately equal portions of the incoming beam. The reflected light beam again reflects from metallized layer 36 which is disposed on a surface of prism 34. Beam splitter 30 and reflective layer 36 cause the formation of both optical path I, which consists of that light which passes through beam splitter 30, and optical path II, which consists of that light which reflects from the beam splitter and from reflective layer 36. A block 38 of black glass is disposed adjacent to one side of prism 32 to absorb any unwanted light that is radiated thereto. Paths I and II are provided with filters 40 and 42, respectively, which transmit yellow and blue light respectively. As is well known in the art, light transmitting components such as prisms 32 and 34 and filters 40 and 42 can be cemented together with transparent bonding material. Color filters 40 and 42 need not be affixed to the beam splitter assembly, but may be located at almost any mechanically feasible position such as immediately adjacent target 26. Other combinations of optical devices may be combined to form beam splitter 30 and fold mirror surface 36. For example, rhomboidal prism 34 may consist of two identical triangularly shaped prisms. Said related application Ser. No. 617,416 discloses various other modifications which may be employed to obtain optical paths I and II.

Filters 40 and 42 may be omitted by employing a dichroic beam splitter rather than a half silvered mirror. The beam splitter itself could be designed to transmit one wavelength of light, e.g., the yellow light, and reflect the other wavelength, viz. the blue light.

If the system were designed to cause the path I image to appear in the plane of target 26, then absent any correction means, the path II image would appear at a plane in front of target 26 such as that plane represented by broken line 44. The plane in which the path II optical image is formed may be made to coincide with the plane in which the path I optical image is formed by inserting into path II a block 46 of transparent material. The effect of block 46 is to cause the focal or image plane to move away from lens 22, but the size or magnification of the image does not change, provided that surfaces 48 and 50, through which the light passes, are parallel, planar surfaces.

Figure 2:
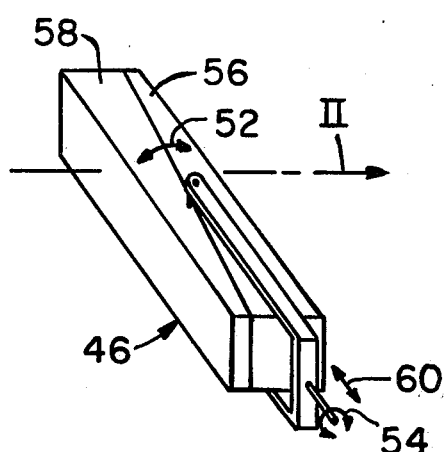
FIG. 2 is an oblique view of a displacement block which may be employed in the system of FIG. 1.

The system of FIG. 1 results in the division of a microscope image into two coplanar, adjacent images having different narrow-band colors. Displacement block 46 is mounted by means such as that illustrated in FIG. 2 so that it can rotate about two axes, thereby achieving the rotation represented by arrows 52 and 54. The displacement block can therefore be employed to precisely position the top image formed by the path II light adjacent to the lower image formed by the path I light. The aperture size at means 21 is adjusted to prevent image overlap at target 26.

For various reasons it may be necessary to attenuate the light in one of the paths. For example, the camera tube could be more sensitive to the blue light or beam splitter 30 might reflect more light than it transmits. Block 46 is therefore formed from two glass wedges 56 and 58 which are cemented together by transparent bonding material. Wedge 56 is formed from a glass having a higher absorption characteristic than the glass from which wedge 58 is formed. The light passing through displacement block 46 is attenuated by passing through a portion of wedge 56, the amount of attenuation being controlled by movement of block 46 in a direction indicated by arrow 60. As block 46 is moved in the direction of arrow 60, the total thickness of the block does not change; only the relative thicknesses of the low attenuation and high attenuation glasses change, thereby changing the intensity of the light transmitted therethrough. The displacement block is positioned a proper distance behind lens 22 where the minimum optical beam size occurs, thus minimizing the density variation across the light beam. Thus, in addition to causing the path II image to become coplanar and contiguous with the image formed by the path I light, displacement block 46 is also employed to balance the output of camera tube 28 for the two optical images.

Figure 3:
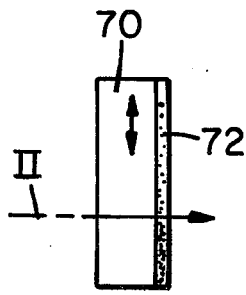
FIG. 3 illustrates another embodiment of the displacement block which may be employed in the system of FIG. 1.

As illustrated in FIG. 3, the displacement block could also consist of a block 70 of transparent material having a film or sheet 72 affixed to one surface thereof. Although sheet 72 has parallel, planar surfaces, an optical density gradient exists between the top and bottom portions of the sheet.

Figure 4:
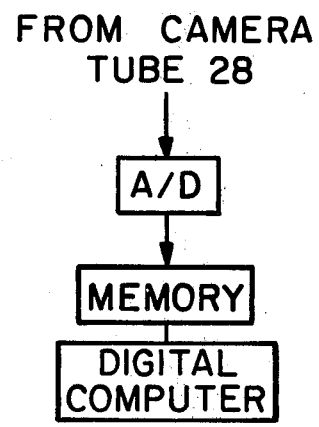
FIG. 4 illustrates in block diagram form a particular type of utilization means which may be employed in conjunction with the system of FIG. 1.

The output of camera tube 28 is connected to utilization means 64 which may consist of the blood cell identification system disclosed in the aforementioned U.S. Pat. No. 3,819,913. In accordance with that patent, the utilization means consists of an analog to digital converter which produces digitized words that are stored in a memory. A digital computer connected to the memory processes the digital words stored therein. This type of utilization means is illustrated in block diagram form in FIG. 4. The utilization means could also be a color projector such as that disclosed in said related application Ser. No. 617,416. In accordance with the teachings of that application, the color projector may consist of a projection cathode ray tube which generates two black and white images that correspond to the two colored images formed on target 26. Operatively associated with the cathode ray tube is a projection system which optically recombines the two video images after they have been propagated through the proper color filters. Basically, the system for recombining and projecting the images is the reverse of the beam splitting and imaging system of FIG. 1.

The theory of image displacement by a transparent plate or block is well known; see, for example, W. J. Smith, *Modern Optical Engineering*, McGraw-Hill, 1966, pp. 82–84. A discussion relating to the derivation of the thickness of block 48 appears in said related application Ser. No. 617,416. Optimization of image distances and magnification, and minimization of abberatons in the images are best done by computer ray trace programs which match such things as indices of refraction, lens focal length, wavelengths of light in each path, thickness of the block, and the total glass thickness in each path.

While only the preferred embodiments of the invention have been illustrated and described, it will be apparent, especially to those versed in the art, that the invention may take other forms and is susceptible of various changes without departing from the principles of the invention. For example, whereas the invention has been specifically described in conjunction with apparatus for identifying white blood cells, other biological specimens may be similarly examined, and moreover, image sources other than a microscope may be employed to provide the optical preprocessor with an image-containing light beam. Also, instead of employing color filters to modify one or more of the images in the split optical paths, other optical devices such as light polarizing means, contrast varying means or the like may be employed.

I claim:

1. A system for analyzing different characteristics of an optical image comprising
   means for producing an image-containing light beam,
   a first beam splitter in the path of said light beam for transmitting a first portion of said light beam along a first optical path and for reflecting a second portion of said light beam in a direction away from said path,
   means for reflecting said second portion of said light beam along a second optical path parallel with said first optical path,
   means disposed in at least one of said first and second optical paths for modifying a characteristic of the image formed along that path,
   a detector for converting optical images into electrical signals, said detector having a planar target disposed in the image plane of said first optical path,
   a block of transparent material disposed in said second optical path, the surfaces of said block through which light passes being planar and parallel, the distance between said surfaces being such that the image formed along that path is coplanar with said target, said block being movable in a direction perpendicular to said second path, the effective optical density presented by said block to said second path depending upon the portion of said block that is traversed by said second path, and
   utilization means responsive to the electrical signal from said detector.

2. A system in accordance with claim 1 wherein said block is mounted so that it can rotate about two axes.

3. A system in accordance with claim 1 wherein said block consists of two glass wedges, one of said wedges having a greater absorption characteristic than the other.

4. A system in accordance with claim 1 wherein said means for modifying comprises two filters having different color characteristics, one of said filters being disposed in each optical path.

5. A system in accordance with claim 1 wherein said means for producing comprises a specimen containing microscope slide, means for directing a beam of intense light through said slide, and lens means for directing light emanating from said slide onto said beam splitter.

6. A system in accordance with claim 5 wherein said utilization means comprises an analog to digital converter for producing digitized words representing the optical density of points in each image appearing on said target, a memory for storing the digital words generated by said converter, and a digital computer connected to said memory for processing the digital words stored therein.

7. A system for producing stored digital words representing the optical characteristics of a specimen containing microscope slide comprising
   means for directing a beam of light through said microscope slide,
   lens means in the path of light emanating from said slide for producing an image-containing light beam,
   a beam splitter in the path of said image-containing light beam for transmitting a first portion of said light beam along a first optical path and for reflecting a second portion of said light beam in a direction away from said first path,
   means for reflecting said second portion of said light beam along a second optical path parallel with said first optical path,
   two filters having different color characteristics, one of said filters being disposed in each optical path,
   a detector for converting optical images into electrical signals, said detector having a planar target disposed in the image plane of said first optical path,
   a block of transparent material disposed in said second optical path, the surfaces of said block through which light passes being planar and parallel, the distance between said surfaces being such that the image formed along that path is coplanar with said target, said block being movable in a direction perpendicular to said second path, the effective optical density presented by said block to said second path depending upon the portion of said block that is traversed by said second path, and
   utilization means responsive to the electrical signal from said detector.

8. A system in accordance with claim 7 wherein said block is mounted so that it can rotate about two axes.

9. A system in accordance with claim 8 wherein said block consists of two glass wedges, one of said wedges having a greater absorption characteristic than the other.

10. A system in accordance with claim 9 further comprising a digital computer connected to said memory for processing the digital words stored therein.

* * * * *